United States Patent
Travis

[15] 3,704,061
[45] Nov. 28, 1972

[54] WAVELENGTH SELECTIVE MIRROR SYSTEMS

[72] Inventor: David Neil Travis, 60 Colonial Road, Glenbrook, Conn. 06906

[22] Filed: March 25, 1970

[21] Appl. No.: 22,575

Related U.S. Application Data

[63] Continuation-in-part of Ser. No. 810,476, March 26, 1969, Pat. No. 3,527,523.

[52] U.S. Cl. ............350/171, 95/12.2, 178/5.4, 350/148, 350/157, 350/166, 350/173, 350/174
[51] Int. Cl. ..........................G02b 27/14, G02b 5/28
[58] Field of Search......350/169, 171, 173, 174, 166, 350/148, 152, 157; 178/5.4 BD, 5.4 E; 95/12.2

[56] References Cited

UNITED STATES PATENTS

| | | | |
|---|---|---|---|
| 3,333,053 | 7/1967 | Back | 350/173 UX |
| 3,497,283 | 2/1970 | Law | 350/148 |
| 3,527,523 | 9/1970 | Travis | 350/171 |

*Primary Examiner*—David Schonberg
*Assistant Examiner*—John W. Leonard
*Attorney*—Samuel Branch Walker

[57] ABSTRACT

Polychromatic beams are separated into component colors or wavelength bands by wavelength selective filters combined with a beamsplitter. These filters are arranged on three sides of a cubic space, with a beamsplitter on the diagonal. The space may be air or a cube of transparent material, such as glass. If the beam is to be split into more than three colors, a second cube is used with additional beamsplitters. At least one filter which receives a beam split by the beamsplitter, either the filter which receives the transmitted beam or the reflected beam, must be a reflecting filter which reflects the wavelengths that are not transmitted. Preferably such filters are interference filters. Two or three reflecting filters give better energy utilization. The beamsplitters may be chromatic or achromatic. Phase retardation plates compensate to polarization effects. The invention is particularly useful with electrical signal detectors for readouts for coded marks using photoluminescent components forming the code.

3 Claims, 5 Drawing Figures

INVENTOR.
DAVID NEIL TRAVIS
BY
Samuel Branch Walk
ATTORNEY

INVENTOR.
DAVID NEIL TRAVIS
BY
Samuel Branch Walker
ATTORNEY

WAVELENGTH SELECTIVE MIRROR SYSTEMS

CROSS-REFERENCES

This application is a continuation-in-part of application Ser. No. 810,476, Mar. 26, 1969 entitled "SEPARATION OF POLYCHROMATIC LIGHT BEAMS INTO THEIR CONSTITUENTS BY MEANS OF WAVELENGTH SELECTIVE MIRROR SYSTEM," now U.S. Pat. No. 3,527,523.

BACKGROUND OF THE INVENTION

Resolution of beams of polychromatic radiation into component colors is very common, particularly for color photography and for color television. These applications require development of good quality optical image information, that is, information developed by the separated colors must allow recombination to produce the original image with minimal degradation of quality. In a color television camera, for example, three images of the scene being viewed are formed simultaneously, so that a red image of the scene is focused on one of the camera tubes, a green image on the second, and a blue image on the third. Techniques for accomplishing this type of chromatic resolution are highly developed and are described in the literature, such as in pages 291–292 of Volume II, Applied Optics and Optical Engineering (Academic Press, New York, 1965), edited by R. Kingslake. Good image quality requires careful arrangement of high quality optical elements, and apparatus of this type is expensive.

SUMMARY OF THE INVENTION

The present invention separates colors, using this term broadly to cover wavelength bands whether they are all in the visible or whether some are in the ultraviolet and infrared, by means of filters placed on the sides or faces of a cubic space with a diagonal beamsplitter in the space. The space may be hollow or it may be a cube of transparent material. Either will be referred to as an "optically hollow cube". At least one of the filters which receives either the transmitted or primary reflected light from the diagonal beamsplitter must reflect wavelengths which it does not pass. The preferred type of such a filter is an interference filter, and of course filters on all three sides of the cubic space may be of the reflecting type. The fourth face allows entry of the polychromatic beam. It will be noted that we are dealing with those four faces of a cubic space whose normals lie in a single plane. The two other sides, i.e., top and bottom of the cube do not affect the optics of the device. The beamsplitter along the diagonal of the cube may be achromatic or chromatic. If more than three colors are to be separated from a polychromatic beam, two cubes may be used, with an additional dichroic beam-splitter which is first encountered by the polychromatic beam and passes a band of radiation appropriate to the filters in the first cube and reflects the radiation appropriate for the second cube. This permits separation of up to six colors, but it can also be used for separating five colors, in which case the second cube will have only two filters and the other side may be a mirror.

The present invention is particularly useful with polychromatic beams whose energy may be low, and where the requirements for geometric image quality are not so high and permit some variation in path length. Very high spectral purity may be obtained by the present invention wherever needed. Energy utilization, particularly where all of the filters on the cube or cubes are reflecting, is very good, and this is of great importance in readers for multicomponent photoluminescent marks. Information storage and retrieval via such marks which contain mixtures of photoluminescent components, and particularly where some or all of the components are narrow band luminescers, is described and claimed in the application of Freeman and Halverson, Ser. No. 596,366, filed Oct. 14, 1966, now U.S. Pat. No. 3,473,027, issued Oct. 14, 1969. While the readout of photoluminescent marks is a most important field for the present invention, it is not limited by the nature of the source of the polychromatic beam.

In terms of the present invention, a polychromatic beam of radiation designates a beam composed of photons having a number of different energies or wavelengths. It is not at all necessary that all wavelengths be represented. The polychromatic beam does not have to represent a continuous spectrum. There may be photons in various wavelength bands with no photons present at some intermediate wavelengths.

In any one cube of the present invention, the polychromatic beam encounters a beamsplitter section which is along the diagonal and which is largely non-absorbing for wavelengths of interest in the separated colors. The incident beam is separated physically into two beams, which may or may not have the same spectral distribution, i.e., the beamsplitter may be achromatic or dichroic. A separated beam then may encounter an interference filter which transmits certain wavelengths and reflects others. This reflected radiation constitutes a beam which again encounters the initial beamsplitter and undergoes a separation into two physically separated sub-beams, one of which may encounter another interference filter. In essence, radiation reflected from interference filters is turned back on itself and encounters the beamsplitter section at least once, and sometimes more than once, before final disposition of the beam occurs. It is this multiple use of the beamsplitter section which allows a compact, simply constructed assembly for separating a polychromatic beam into selected component colors. Furthermore, these separated selected component color beams have a common optic axis in the polychromatic beam.

It will be noted that filters, such as interference filters, are encountered by beams striking them at essentially normal incidence. As an example, three filters can be arranged to form three vertical sides or faces of a cube. The polychromatic beam enters through the missing vertical face of the cube, along the normal to the opposite face. A non-absorbing beamsplitter section is placed along the diagonal of the cube, such that the beam reflected from the beamsplitter section is directed along the normal to one of the interference filter faces. By appropriate selection of the beamsplitter section, and of the interference filters, an efficient separation of the initial polychromatic beam into three wavelengths bands of rather high spectral purity can be achieved.

If more than three wavelength bands or colors are to be selected out of the original polychromatic beam, more than one cube is used, with a chromatic beamsplitter, such as an inclined dichroic beamsplitter, ahead of the assembly to effect a more gross separation into two beams, one containing shorter wavelengths and the other longer wavelengths of the original beams. One bean encounters one cube and the other the other. With two cubes this permits selection of up to six colors. It is possible to have more than two cubes with an additional dichroic beamsplitter.

The diagonal beamsplitter section in the cube can be achromatic or can be selected to exhibit different transmission to reflection ratios at different wavelengths. If it is achromatic the ratio of transmission to reflection preferably is about unity, although it may vary between rather wide limits. If it is a chromatic beamsplitter section, this ratio preferably is near unity for one color, is higher for the second color, and is lower for the third color.

The preferred interference filters sometimes may be considered as trichroic mirrors because each one passes one color and reflects other colors on either side for a wavelength range determined by the characteristics of the filter. The reflected bands are not infinitely wide for a variety of reasons, some related to the intrinsic characteristics of optical interference phenomena particularly in thin films, and others related to construction and materials used in practical filters.

In the case of achromatic beamsplitters, it is advantageous to keep within a range not too far from 50:50 for the ratio of transmitted intensity to reflected intensity, although 70:30 and 30:70 still are useful. In the case of chromatic beamsplitters used with two filters which have high reflectivity for the third wavelength band, the transmissivity to reflectivity ratio exhibited by the beamsplitter for this third wavelength band should fall in the same range. Obviously the transmissivity for one of the other wavelength bands ideally would approach 100 percent, and the reflectivity for the third wavelength band would approach 100 percent. Selection of the chromatic behavior of the beamsplitter can be made to complement reflectivity characteristics of practical interference filters.

For many dichroic beam splitters, and sometimes for achromatic beamsplitters of the multilayer dielectric type, illumination at an angle of 45° will cause polarization of both the transmitted and reflected beams. In order to maximize the concentration of light in the direction of the third, indirectly illuminated, side of the cube these polarization effects are controlled by introducing phase retardation plates between the cube and the reflective filters.

An extreme example may occur for a chromatic beam splitter with a reflectance to transmittance ratio of unity for a specific wavelength. Division of the incident, unpolarized light beam may be a resolution into two orthogonal plane polarized light beams rather than a division by amplitude splitting. If these two plane polarized beams are reflected back towards the diagonal beam splitter without any change of polarization, they will retrace their original paths; so that all of the light is directed back towards the source and none towards the third side of the cube. This situation can be reversed by placing properly oriented quarter wave retardation plates between the cube and the two reflecting filters. Light beams returning toward the cube after reflection at one of the interference filters will have passed twice through a quarter wave plate and hence their planes of polarization will be rotated by 90° relative to the planes of polarization of the same beams after first encountering the beamsplitter. Upon meeting the beamsplitter for a second time these polarization rotated beams will behave in a manner opposite to that at the original encounter; e.g. if first reflected they will be transmitted and vice versa. In this extreme example the addition of quarter wave plates causes all the light of the specific wavelength to be directed toward the third side of the cube and none is lost in the direction of the source.

In the more general case where the diagonal beamsplitter produces only partial polarization, not all of the available light of the specific wavelength can be concentrated on the third side of the cube, but the inclusion of retardation plates gives optimum efficiency.

Phase retardation plates suitable for use in the present invention need not be of high optical quality since no geometric imaging is required. Plates made from a birefrigent plastic such as cellophane may be used, and are readily prepared and inexpensive. A sample of plastic having a preferred phase retardation is selected by trial.

The polychromatic beam in the present invention need not be collimated, although, of course, it can be. It is an advantage that the particular nature of the polychromatic beam is, therefore, not sharply critical and that compromises which will give good energy utilization with adequate resolution can be chosen for many uses. This is a very different situation from prior art proposals for television cameras, photographic work and the like, where very sharp geometric resolution is essential. The present invention with its efficient energy utilization cannot be used for such devices where sharp imaging is essential. This is further evidence that emphasizes that the present invention operates under different optical requirements than those used in color photography and color television.

Reference has been made above to the fact that the cube may be hollow or that it may be made partly or wholly of transparent material. In each case the radiant energy is able to pass, and this will be referred to more generally throughout the remainder of the specification as "an optically hollow cube."

DESCRIPTION OF THE PREFERRED EMBODIMENTS

Figure 1:
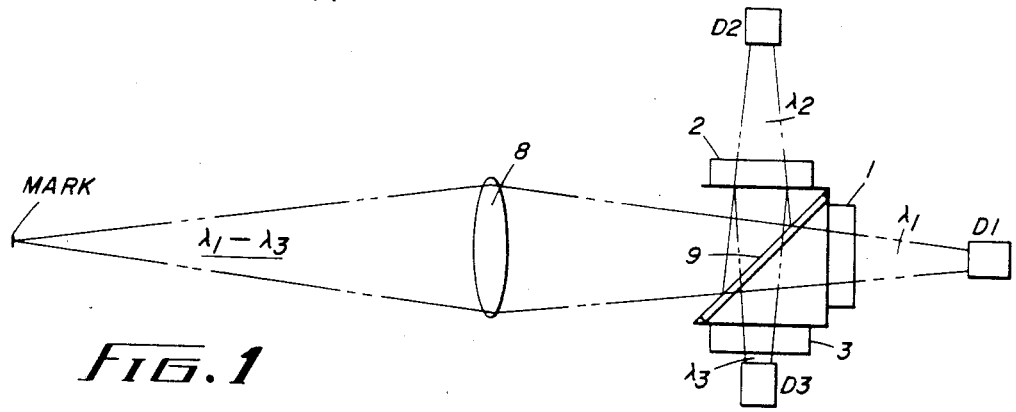
FIG. 1 is a diagrammatic illustration of separating three colors by means of a single optically hollow cube, with a converging incident polychromatic beam.

FIG. 1 illustrates in diagrammatic form an optically hollow cube. This also illustrates a converging beam formed by the lens (8). A light beam containing the three wavelengths $\lambda_1$, $\lambda_2$ and $\lambda_3$ encounters an achromatic beam splitter 9 at 45° incidence, in this particular illustration a 50:50 splitter. One half of the light is transmitted toward interference filter 1, with intensity which may for convenience be designated $1/2 \lambda_1 + 1/2 \lambda_2 + 1/2 \lambda_3$. Similarly one half of the original beam is reflected toward filter 2 and is again designated $1/2 \lambda_1 + 1/2 \lambda_2 + 1/2 \lambda_3$. The transmitted beam impinges upon filter 1 where the component $1/2\lambda_1$ is transmitted through the detector $D_1$. The remainder ($1/2 \lambda_2 + 1/2 \lambda_3$) is reflected back toward the beam splitter 9, filter 1 being illustrated as a good reflector for $\lambda_2$ and $\lambda_3$. In a similar way, that half of the original beam reflected by 9 and containing $1/2\lambda_1 + 1/2\lambda_2 + 1/2\lambda_3$ is incident upon filter 2 where again $1/2\lambda_2$ is transmitted to detector $D_2$ and the remainder ($1/2\lambda_1 + 1/2\lambda_3$) reflected back towards 9. The light beam ($1/2\lambda_2 + 1/2\lambda_3$) coming from filter 1 is partially reflected by 9 towards filter 3 with intensity $1/4\lambda_2 + 1/4\lambda_3$ whilst the beam ($1/2\lambda_1 + 1/2\lambda_3$) coming from filter 2 is partially transmitted by 9 in the direction of filter 3 and with intensity $1/4\lambda_1 + 1/4\lambda_3$.

Thus, in all, there impinges upon filter 3 a total intensity expressed by ($1/4\lambda_1 + 1/4\lambda_2 + 1/2\lambda_3$). The $1/2\lambda_2$ is passed through filter 3 to detector $D_3$. while ($1/4\lambda_1 + 1/4\lambda_{2n}$) is reflected back towards beam splitter 9 for a third encounter. A small fraction of the light may reach filters 1 and 2 again after various reflections and will ultimately reinforce those components $1/2\lambda_1$ and $1/2\lambda_2$ which reach the filters after only one encounter with (9). These secondary contributions to the detectors $D_1$ and $D_2$ will be out of focus at the detectors since they have travelled along a greater path length than the primary contributions to these detectors. Where the beam results from a spot in a reader for a photoluminescent code, this defocusing is of little significance; but of course if the beam were to be going to television cameras or photographic negatives, it would be useless because there would be blurring, which, as has been pointed out above, is a further indication of the different optical principle under which the present invention operates.

Figure 3:
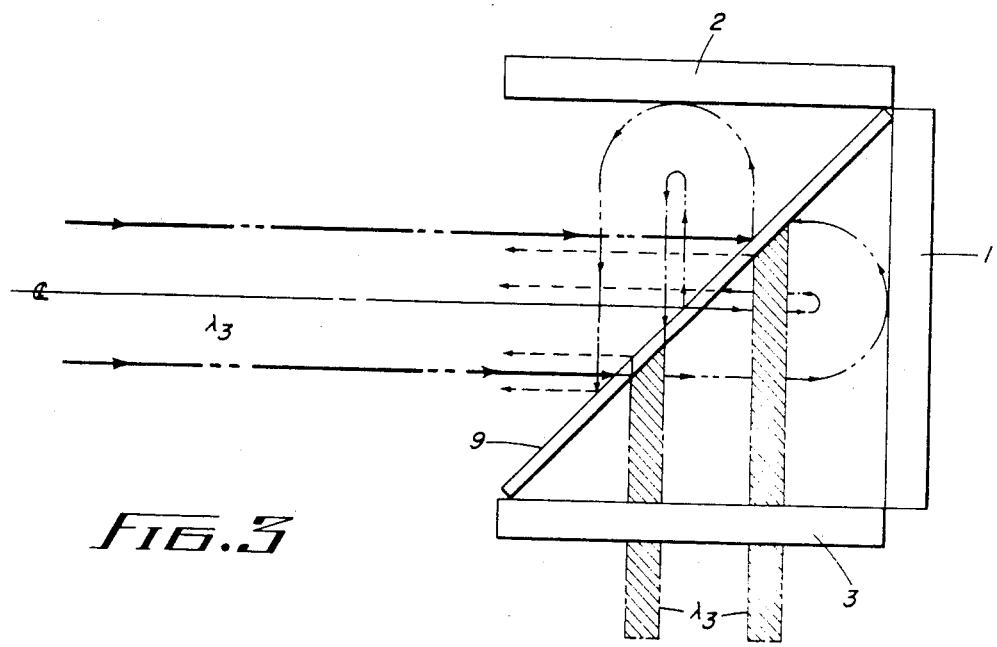
FIG. 3 is a diagram of a cube tracing one of the colors and showing multiple reflections.

FIG. 3 illustrates in symbolic form what happens to one color, designated by $\lambda_3$, of a polychromic beam impinging on a color separator assembly of the present invention. For convenience beam splitter 9 is selected to transmit one half the intensity of $\lambda_3$ and to reflect one half. This is indicated symbolically by making the transmitted and reflected beams one half as wide as the incident beam in FIG. 3. These initially transmitted and reflected beams are shown striking filters 1 and 2 respectively. For convenience both filters 1 and 2 are depicted as reflecting $\lambda_3$ completely. The transmitted portion of $\lambda_3$ is turned back on itself by filter 1, and on striking beamsplitter 9 one half of it is reflected down to filter 3 which is depicted as transmitting color $\lambda_3$ completely. This beam, representing one fourth of the initial incoming beam, is designated by hatching in FIG. 3. Similarly, the portion of the incoming beam which was reflected to filter 2 is turned around on itself, impinges on beamsplitter 9 again, and one half is transmitted to filter 3 and passes through. Thus, out of the initial beam, one half of the intensity of $\lambda_3$ is depicted by the inked in lines as transmitted by filter 3, while one half of it is lost. If the transmissivity and reflectivity of beamsplitter 9 for $\lambda_3$ are designated by t and r respectively, and the reflectivities of filters 1 and 2 for $\lambda_3$ are designated by R, then the fraction of the initial intensity of $\lambda_3$ which impinges on filter 3 is given by the expression $2 \times R \times r \times t$. The only angles involved in construction are 90° and 45°, and filters 1, 2 and 3 all operate at normal incidence.

Beamsplitter 9 in FIG. 3 can be either chromatic or achromatic. If chromatic, transmission should be larger than reflection for wavelengths passed by filter 1, and reflection should be larger than transmission for wavelengths passed by filter 2. It is preferable that reflectivity and transmissivity be approximately equal for wavelengths transmitted by filter 3.

As FIG. 3 is merely a diagram of the ray paths for $\lambda_3$, the other elements, such as detectors, lenses and the like, are omitted. Also, FIG. 3 shows a collimated beam coming in, which somewhat simplifies the illustration of the rays. The rays are shown turned with a curve, but of course in an actual device the reflections would be at precise angles.

Figure 5:
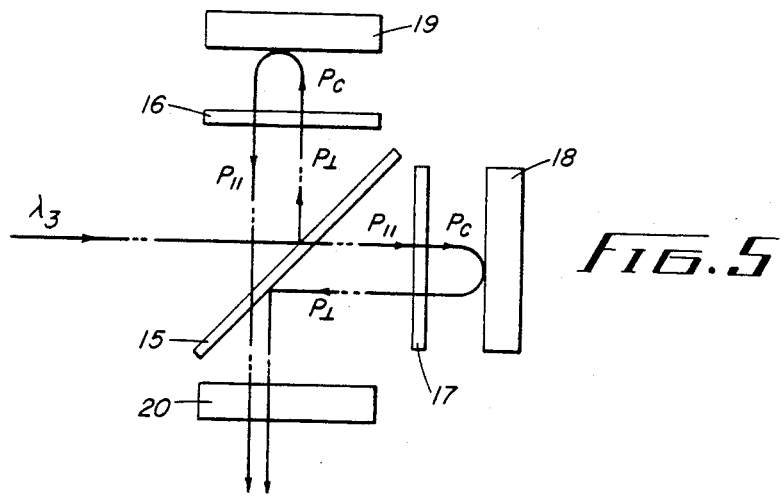
FIG. 5 illustrates the separation of three colors using a polarization splitting dichroic mirror.

FIG. 5 is a diagram similar to FIG. 3 but illustrates a chromatic beam splitter 15 which resolves $\lambda_3$ into two plane polarized beams of equal intensity. $P_{\shortparallel}$ represents the polarized light beam whose electric vector vibrates in a plane parallel to that of the figure. $P_\perp$ represents the beam whose electric vector vibrates in a plane perpendicular to that of the figure. Quarter wave retardation plates 17 and 16 for wavelength $\lambda_3$ are located between the cube and filters for $\lambda_2$ and $\lambda_1$ 18 and 19. Parallel polarized light of wavelength $\lambda_3$ is transmitted by 15 and passes through the quarter wave plate 17 becoming circularly polarized $P_c$. After reflection at the filter 18 it returns through the quarter wave retardation plate (17) and becomes plane polarized again, but in a plane rotated by 90° from that of the beam initially transmitted by the beam splitter 15. In other words, parallel polarized light is converted to perpendicularly polarized light by the double passage through the quarter wave plate. Perpendicularly polarized light at the second encounter with the chromatic beam splitter 15 is titally reflected towards the filter 20. Similarly the perpendicularly polarized beam initially reflected by the chromatic beam splitter 15 is converted into parallel polarized light after passing twice through the quarter wave plate 16 and reflection at the filter 19. Upon meeting chromatic beam splitter 15 again it is totally transmitted towards the filter 20. In this specific example, all the radiation of wavelength $\lambda_3$ is directed towards the third filter 19 and none is lost in the direction of the source.

Light beams of wavelengths $\lambda_1$ and $\lambda_2$, transmitted by filters 17 and 18 respectively are not shown in FIG. 5. Beam splitter 15 is a chromatic or dichroic mirror and is usually chosen for high transmittance at $\lambda_1$ (i.e. both $P_{\shortparallel}$ and $P_\perp$ transmitted) and high reflectance at $\lambda_2$ (both $P_{\shortparallel}$ and P reflected).

Although illustrated in FIG. 5 as spaced from the cube, in construction, the phase retardation plates and filters can be mechanically located adjacent to the cube, which enables more compact construction.

While maximum effect can be obtained by a dichroic mirror that splits the parallel and perpendicular components of beam $\lambda_3$ exactly, a less than perfect splitting gives effective results, and if the reflected and transmitted beams are elliptically polarized, retardation plates are chosen which maximize the intensity of the wavelengths of interest at the detectors.

Figure 2:
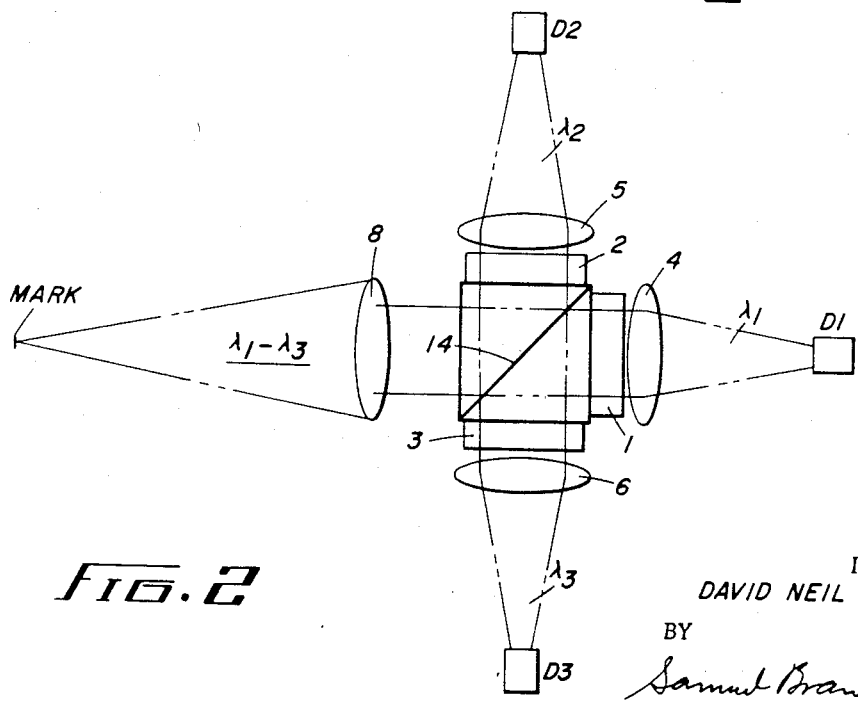
FIG. 2 is a similar diagram of a modified cube with a collimated incident beam.

FIG. 2 is a diagram similar to FIG. 1 but shows a beam collimated by lens 8, with additional lenses 4, 5 and 6 which reimage the mark with radiation transmitted by filters 1, 2 and 3 onto their respective detectors $D_1$, $D_2$, $D_3$. The optical arrangement in FIG. 2 uses a collimated beam within the cube, as contrasted with a converging beam in FIG. 1. This minimizes the blurring of images caused by optical path length variations within the cube for different rays reaching the same detector. Hence somewhat smaller detectors can be used in FIG. 2 than would be appropriate for FIG. 1 for the same size marks. With some detectors this increases speed of response.

FIG. 2 also illustrates a modified form of optically hollow cube which is solid although transparent, for example a glass cube. The form of the beamsplitter here is somewhat different than in FIG. 1 and so it is given a different reference numeral, 14. On the other hand the beamsplitter arrangement of FIG. 1 is also useable in FIG. 2.

Figure 4:
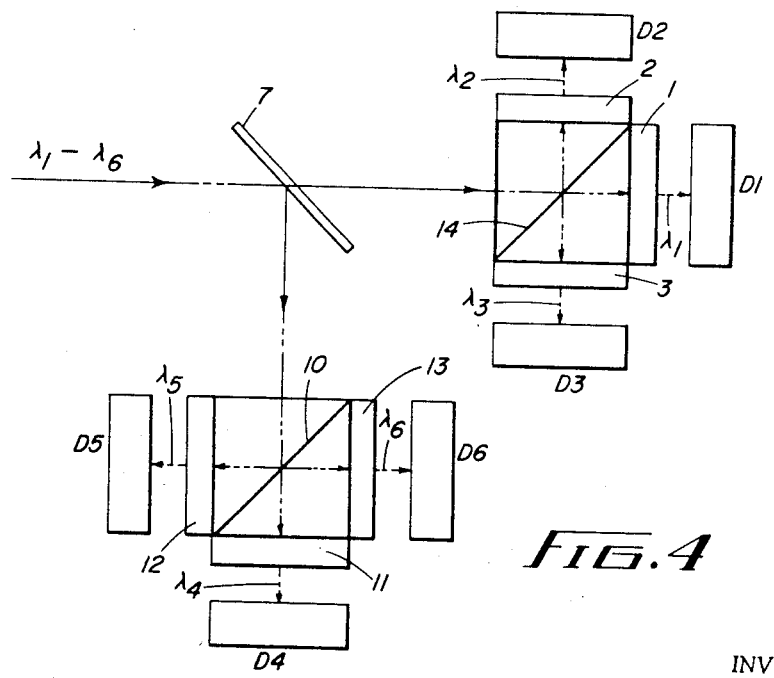
FIG. 4 illustrates separating six colors with two cubes and an auxiliary beamsplitter.

FIG. 4 illustrates the situation with six colors, using two optically hollow cubes. The one to the right is the same as shown in FIG. 2 and the parts bear the same reference numerals. However, there is an additional beamsplitter 7 which reflects part of the beam into a second optically hollow cube which is similar to the first one but is provided with a different beamsplitter 10 and filters 11, 12 and 13 for colors $\lambda_4$, $\lambda_5$ and $\lambda_6$. The detectors which receive these colors from the filters are designated $D_4$, $D_5$, and $D_6$ respectively.

As has been stated above, the cubes in FIGS. 1 to 4 are optically hollow. It will also be noted that the drawings have shown sections through the cubes which, of course, in section are squares with one side open. The top and bottom of the cube do not function in the light transmission system.

In the drawings, such as FIGS. 1 to 4, the filters may all be reflecting filters, but it will be apparent from a consideration of FIG. 3 that actually only one of the filters must of necessity be reflecting. This is the filter which receives either the transmitted beam through the beamsplitter 9 as shown in FIG. 3 or it could be filter 2, which would receive the primary reflected beam from the beamsplitter 9. The operation is the same, but, for example, in FIG. 3 if filters 2 and 3 were absorption filters only half of the available energy in $\lambda_3$, namely the hatched portion to the right of the figure, would be received. In general, the question of whether more than the necessary one reflecting filter should also be reflecting can be chosen in accordance with energy and other requirements, which shows that the invention is capable of a great deal of flexibility.

Where chromatic beamsplitters are used, as has been stated, sometimes the chromatic selection is sufficiently marked that it is not necessary to increase the energy by the multiple reflections. In such a case filter 3 would not have to be reflecting. However, reflecting filters are reasonably economical and it is therefore preferable though not essential to use them throughout even with chromatic beam splitters.

The descriptions of the drawings have been in terms of the maximum number of colors to be separated. It should be obvious that if a beam has less than the maximum number, the missing color will not be detected. When dealing with multiple cubes, it is not necessary that the full number of separable colors be provided for. For example, if a beam has five colors instead of six, one of the sides of one of the cubes can be a plane mirror.

The wavelengths are referred to as $\lambda_1$, $\lambda_2$ and $\lambda_3$ — these may in general be primary colors such as red, yellow and blue, but more conveniently in information storage and retrieval, particularly with photoluminescent marks and readouts, are sharply chosen to match particular components of interest — some of which may have wavelengths outside of the visible region.

The system of multiple cubes for more than three wavelengths is particularly useful with rare earth luminescers with interference filters sharply selective for luminescence from components such as disclosed in U.S. Pat. No. 3,473,027, supra at:

| Rare Earth | Luminescence-wavelength in microns |
|---|---|
| Praseodymium | 0.51 or 0.65 |
| Neodymium | 0.88 or 1.06 |
| Samarium | 0.645 |
| Europium | 0.613 |
| Terbium | 0.543 |
| Dysprosium | 0.576 |
| Ytterbium | 0.970 |
| Erbium | 0.52, 0.55, or 1.54 |
| Holmium | 0.54 |
| Thulium | 0.48, 0.8 |

As can be seen from the comparatively narrow spacing between lines, sharper interference filters are required than would be used for resolution into red, blue and green for primary color separation in photography or television.

A system for splitting white light into red, blue and green components is described in U.S. Pat. No. 3,497,283, Law, COLOR SELECTION POLARIZING BEAM SPLITTER, Feb. 24, 1970.

With coded luminescent systems, the reliable identification of at least six of these components is desirable, and by plural cube systems all nine can be resolved without undue loss of optical energy, Interference filters with a pass-band of 200 Angstroms permit such resolution.

I claim:

1. A system for separating different wavelength bands from a polychromatic beam of radiation having wavelengths which obey optical laws which comprises,
    a. an optically hollow cube having a diagonal plane chromatic beamsplitter, the two edges thereof coinciding with edges separating four faces of the cube,
    b. one of said faces being open to an incident polychromatic beam and reflecting interference filters on at least two of the other three faces, each said interference filter passing a different wavelength band of radiation, and reflecting substantially all others, each said wavelength band being about 200 angstroms, and hence being sharply selective for the wavelengths of specific rare earth luminescers, whereby the incoming polychromatic beam is split by the beamsplitter, part being reflected to a first face and part transmitted to a second face of the cube, and each interference filter on the first and second faces reflects a selected portion of the radiation back toward the beamsplitter which transmits and reflects, respectively, at least part of the selected portion of the radiation to the third face of the cube, whereby one wavelength component of the incoming polychromatic beam is largely reflected to the first face where it is passed by the interference filter at that face, another wavelength component is largely transmitted to the second face where it is passed by the interference filter at that face, and a third wavelength component is partially reflected and partially transmitted in substantially comparable amounts toward the first and second faces respectively, where the interference filters reflect the component back toward the beamsplitter, c. a phase retardation plate being placed in the radiation path between the beamsplitter and the first cube face and between the beamsplitter and the second cube face so that on passing through the plate twice the third wavelength component has its polarization altered to reverse its transmission and reflection characteristics on a second encounter with the beamsplitter, thereby causing the third wavelength component of the initial polychromatic beam to be diverted to the third face of the cube, d. the cube being oriented so that the optical axis of the polychromatic beam passing through the beamsplitter strikes the open face of the cube at substantially normal incidence.

2. A system according to claim 1 in which said filters are on three sides and all of the filters on the three sides of the cube are interference filters.

3. A system according to claim 1 for separating more than three but not more than six colors from a polychromatic beam, in which a second optically hollow cube is used and a chromatic beamsplitter is positioned to reflect one broad band of radiation into one cube and transmit another and different broad band of radiation into the other cube, the total number of interference filters on the faces of the two cubes corresponding to the number of colors to be separated.

* * * * *